Nov. 18, 1952

O. M. STUETZER 2,618,690

TRANSCONDUCTOR EMPLOYING LINE TYPE FIELD CONTROLLED SEMICONDUCTOR

Filed Oct. 6, 1949

INVENTOR.
OTMAR M. STUETZER
BY Wade Koontz
ATTORNEY and
James S. Shannon
AGENT

Patented Nov. 18, 1952

2,618,690

UNITED STATES PATENT OFFICE 2,618,690

TRANSCONDUCTOR EMPLOYING LINE TYPE FIELD CONTROLLED SEMICONDUCTOR

Otmar M. Stuetzer, Dayton, Ohio

Application October 6, 1949, Serial No. 119,985

1 Claim. (Cl. 175—366)

(Granted under the act of March 3, 1883, as amended April 30, 1928; 370 O. G. 757)

The invention described herein may be manufactured and used by or for the Government for governmental purposes without payment to be of any royalty thereon.

This invention relates to transconductive devices of the type employing a semiconductor as the current controlling element.

In my patent application Serial No. 119,541, filed October 4, 1949 there was described and claimed a transconductive device employing a semiconductor in which the output electrode made a point contact with the semiconductor and in which the input or control electrode was positioned very close to the point contact and served to control the electrical field in the neighborhood of the point contact. Variations in control electrode potential, as by a signal voltage, produced corresponding variations in output electrode current. The device had high input impedance, high current and power amplification, and high efficiency. It had circuit impedance values comparable to those of a vacuum tube and within its power limitations could, like a vacuum tube, be used as an amplifier, detector, oscillator, volume controlling device, grid controlled rectifier, etc. The device also exhibited a peculiar characteristic in that the sign of its mutual conductance was a function of the control electrode bias voltage. This characteristic permitted its use as a phase inverter in which a reversal of phase could be produced by shifting the bias from a value at which the mutual conductance was of one sign to a value at which the mutual conductance was of the opposite sign.

The transconductive device described in the present application is similar to that described above in its characteristics and uses but is different in that a line contact, rather than a point contact, is made between the output electrode and the semiconductor, a line contact being defined as a contact area one dimension of which is very large compared to the other. This type construction is easier, particularly for quantity production of the device, and in addition results in smaller interelectrode capacities, higher mechanical and electrical stability and higher power handling capacity.

It is accordingly the object of the invention to provide a transconductive device employing a field controlled semiconductor and having many of the characteristics of a vacuum while not requiring a heated cathode or an evacuated envelope.

It is a further object of the invention to provide a transconductive device of the semiconductor type having a high input impedance, high current and power amplification and high efficiency.

It is a still further object of the invention to provide a transconductive device of the semiconductor type in which a line contact exists between the output electrode and the semiconductor and in which a control electrode is provided for controlling the electrical field in the neighborhood of the line contact.

It is another object of the invention to provide a transconductive device of the semiconductor type the design of which lends itself readily to modern manufacturing techniques such as evaporation, sputtering and electroplating.

It is still another object of the invention to provide a transconductive device of the semiconductor type which has a high degree of mechanical and electrical stability.

It is a further object of the invention to devise suitable processes for manufacturing transconductive devices of the type described.

The specific details of the invention will be given in connection with the accompanying drawings, showing preferred embodiments of the invention, in which Fig. 1 is a schematic diagram of a transconductive device employing line contact between the output electrode and the semiconductor;

Figures 1, 2, 3, 4, 5:
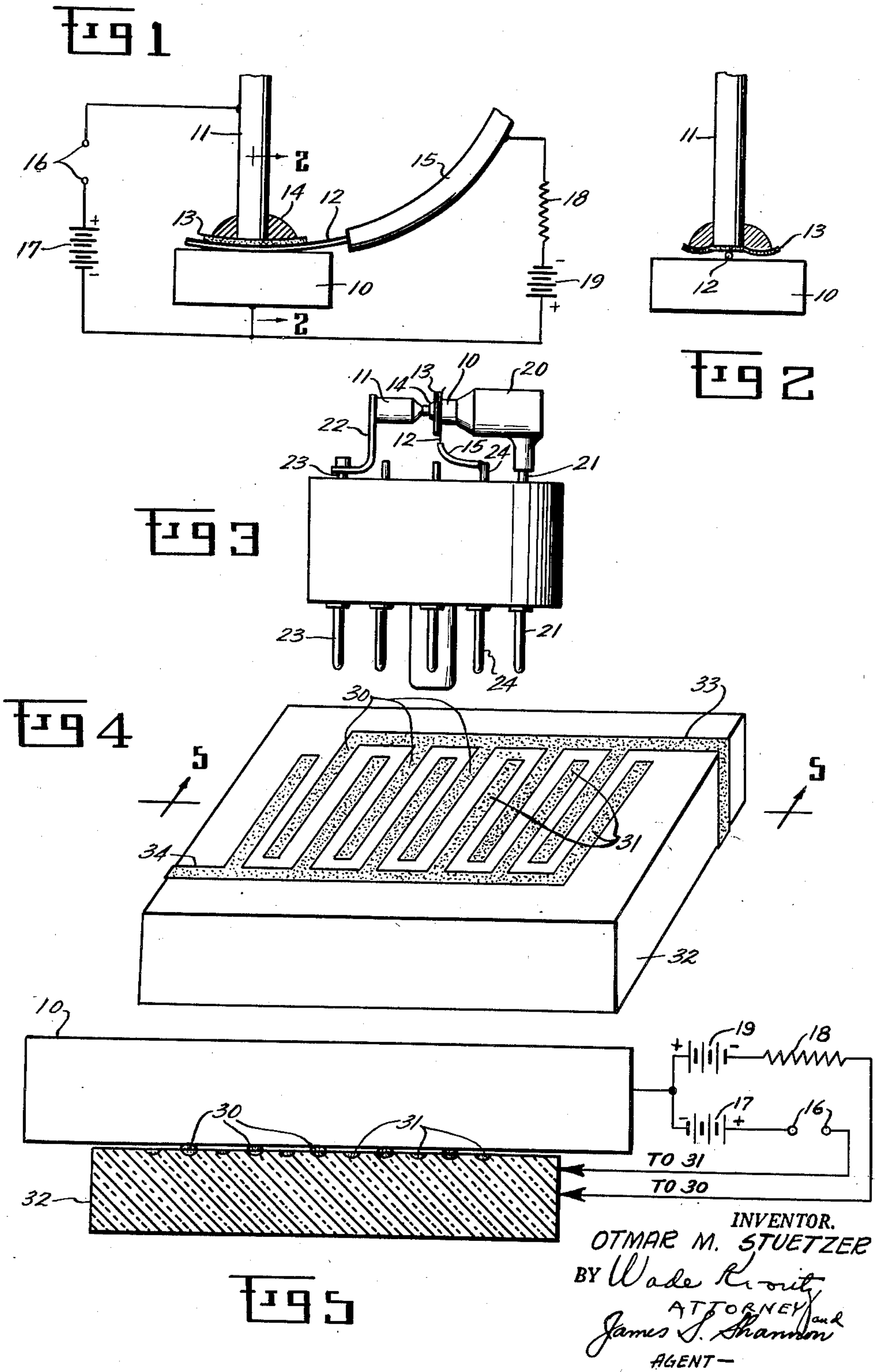
Fig. 2 is a sectional view of Fig. 1.
Fig. 3 shows a practical embodiment of the apparatus shown in Figs. 1 and 2.
Fig. 4 shows an alternative electrode structure.
Fig. 5 is a sectional view of Fig. 4 showing also a semiconductor in cooperative relation with the electrode structure of Fig. 4.

Referring to Fig. 1 a transconductive device in accordance with the invention is shown and comprises a semiconductor 10, a control electrode 11 and an output electrode 12. The output electrode 12 consists of a very fine wire which is pressed against the semiconductor 10 by the control electrode 11. The control electrode is insulated from the wire 12 by a sheet of insulating material 13 which should be as thin as possible. A drop of colloidal silver 14 is deposited on the insulating sheet and around the end of the control electrode to distribute the electrical potential of the control electrode over the insulating member. As semiconductor material n-type and p-type germanium, p-type silicon and tellurium are recommended. The n-type and p-type designation is in accordance with the present theory of conduction in semiconductors, the former representing conduction by free electrons and the latter representing conduction by "holes" due to absences of electrons in the interatomic bonds. The output electrode 12 is shown in Fig. 1 as the core of a piece of Wollaston wire. Wollaston wire is made up of a very fine wire of relatively hard metal such as platinum as the core and an outer sheath 15 of a relatively soft metal such as silver which protects the fine core wire and adds sufficient strength and size to make the composite strand easy to handle. The core may have a diameter of from 2½ to 5 microns and is exposed by eating away the outer layer of silver with a suitable acid usually supplied by the manufacturer of the wire. While Wollaston wire is well suited for use as the output electrode, fine wires of other metals such as tungsten may also be employed. The insulating sheet 13 may be made of any suitable thin insulating material such as thin glass, paper or plastic material such as cellophane. The control electrode should have a flat end surface of greater dimensions than the diameter of the wire forming the output electrode.

An input circuit, consisting of input terminals 16 and bias voltage source 17, is connected between the control electrode and the semiconductor. An output circuit, consisting of load impedance 18 and direct current source 19, is connected between the output electrode and the semiconductor. Variation of the potential of control electrode 11, as by the application of a signal to terminals 16, results in corresponding variations of current in the output circuit. This is believed to be due to the variation of the electric field in the semiconductor in the neighborhood of the line contact. The polarity of source 19 is normally such as to send current in the high resistance or back direction of the semiconductor. For n-type germanium operation in the back direction requires that the output electrode be negative with respect to the semiconductor as shown in Fig. 1. Operation in the forward direction is also possible and results in low noise and low relaxation effects making such operation advantageous in some high frequency applications. Forward operation is also characterized by greatly reduced power output and output impedance as compared with operation in the back direction. The input impedance of the device is extremely high and comparable to that of a vacuum tube. The device also draws no current from bias source 17 which adds to its efficiency.

Fig. 3 shows a practical form which a transconductive device in accordance with the invention may take. The device shown is mounted on a standard octal tube base. A crystal 10 of semiconductive material is mounted on a holder 20 which is in turn mounted on pin 21 of the socket. The fine wire 12, which is shown as the core of a piece of Wollaston wire having an outer sheath 15, is pressed against the surface of the crystal by control electrode 11. The spring support 22 serves to force the control electrode toward the crystal and also to electrically connect the electrode to pin 23. A small thin sheet of insulating material 13 is placed between the control electrode and the output electrode and a drop of colloidal silver 14 is placed on the insulating sheet at the end of the control electrode for the purpose of extending the effective area of the electrode so as to control the field in the neighborhood of the line contact between the wire 12 and the semiconductor 10 over a considerable length of the wire. The output electrode is electrically connected to pin 24.

A different type output and control electrode assembly is shown in Fig. 4. A series of parallel connected metallic output electrodes 30 and a series of parallel connected metallic control electrodes 31, positioned on either side of the output electrodes, are mounted on a piece of insulating material 32. Leads 33 and 34 serve to make electrical connection to the output and control electrodes respectively. The input electrodes 31 are flush with the insulating base 32 but the output electrodes 30 extend slightly above the surface of the base as shown in the sectional view of Fig. 5. When this electrode assembly is pressed against the flat surface of a semiconductor 10, as shown in Fig. 5, the output electrodes 30 make line contacts with the semiconductor but the control electrodes 31 are slightly spaced from the semiconductor so that they do not touch and are able to control the electrical field in the neighborhood of the line contacts between electrodes 30 and the semiconductor. The input electrodes 31 and the output electrodes 30 may be connected in input and output circuits similar to those connected to control electrode 11 and output electrode 12 in Fig. 1. It is evident that the output electrode structure of Fig. 4 provides in effect a number of line contacts in parallel which makes possible higher output current values and higher power output than in the case of Fig. 1.

In order to effectively control the electrical field in the semiconductor in the vicinity of the line contact it is necessary that the sizes of the output and control electrodes and their spacings be extremely small. Accordingly, the output electrodes 30 and the control electrodes 31, and also the spacings between these electrodes, are made to be of the order of 1 to 2 microns. In this respect it is pointed out that, for the sake of convenience, Figs. 4 and 5 are not drawn to scale, and that in an actual embodiment of the electrode assembly the block of insulation 32, must necessarily be much greater in size in comparison to the electrodes than indicated in these figures. The electrode assembly may be made by first engraving the grid-like structure on a flat surface of suitable insulating material such as quartz. The engravings should be 1 to 2 microns wide and equally deep. The spacings between the engraved grooves for the control and output electrodes should also be from 1 to 2 microns. Engraving of this character can be accomplished by the use of a dividing machine such as employed in making optical grids. After engraving a metal such as silver or antimony is applied over the entire engraved area by evaporation or sputtering. The surface of the insulator is then ground off to remove all metal except that remaining in the engraved grooves. The assembly is then placed in an electrolytic solution and the output electrodes 30, but not the control electrodes 31, connected in an electroplating circuit. The resulting plated metal on the output electrodes raises them above the surface of the insulator as shown in Fig. 5. A suitable dielectric layer, such as a thin film of oil or glycerine or other material having a high dielectric constant, may be inserted between the electrode assembly and the semiconductor if desired and the presence of such a film has been found to increase the mutual conductance of the device by a factor roughly proportional to the dielectrode constant. The output electrodes should, of course, be pressed through the film to contact the semiconductor.

I claim:

A transductive device comprising a semiconductor, an output electrode in the form of a fine wire making a line contact with said semiconductor, and a control electrode for controlling the electrical field in the neighborhood of said line contact, said control electrode being of much greater dimensions than said wire and being positioned close to said line contact but separated from said semiconductor and said output electrode by a dielectric.

OTMAR M. STUETZER.

REFERENCES CITED

The following references are of record in the file of this patent:

UNITED STATES PATENTS

| Number | Name | Date |
|---|---|---|
| 2,476,323 | Rack | July 19, 1949 |
| 2,502,479 | Pearson | Apr. 4, 1950 |
| 2,524,033 | Bardeen | Oct. 3, 1950 |
| 2,524,035 | Bardeen et al. | Oct. 3, 1950 |